US007629419B2

(12) United States Patent
Toyoshima et al.

(10) Patent No.: US 7,629,419 B2
(45) Date of Patent: Dec. 8, 2009

(54) PROCESS FOR PRODUCING MODIFIED POLYMER, APPARATUS FOR PRODUCING MODIFIED POLYMER, AND MODIFIED POLYMER

(75) Inventors: Katsunori Toyoshima, Mishima-gun (JP); Toshio Tada, Mishima-gun (JP); Yohei Nishimura, Mishima-gun (JP)

(73) Assignee: Sekisui Chemical Co., Ltd., Osaka-shi (JP)

( * ) Notice: Subject to any disclaimer, the term of this patent is extended or adjusted under 35 U.S.C. 154(b) by 0 days.

(21) Appl. No.: 10/492,701

(22) PCT Filed: Oct. 16, 2002

(86) PCT No.: PCT/JP02/10731

§ 371 (c)(1),
(2), (4) Date: Jul. 27, 2004

(87) PCT Pub. No.: WO03/033548

PCT Pub. Date: Apr. 24, 2003

(65) Prior Publication Data

US 2005/0053792 A1    Mar. 10, 2005

(30) Foreign Application Priority Data

Oct. 16, 2001  (JP) ............................. 2001-318286
Oct. 19, 2001  (JP) ............................. 2001-322179
Dec. 10, 2001  (JP) ............................. 2001-375994

(51) Int. Cl.
*C08F 116/06*   (2006.01)
*C08F 118/08*   (2006.01)
*C08G 2/26*     (2006.01)
*C08G 67/00*    (2006.01)

(52) U.S. Cl. ................. 525/328.8; 525/330.3; 528/232; 528/425

(58) Field of Classification Search ................. 428/426; 525/327.4, 328.8, 330.3, 62; 528/232, 425
See application file for complete search history.

(56) References Cited

U.S. PATENT DOCUMENTS

| | | | | |
|---|---|---|---|---|
| 5,250,614 A | * | 10/1993 | Ono et al. ...................... | 525/58 |
| 5,733,984 A | | 3/1998 | Nakahara et al. | |
| 6,255,529 B1 | * | 7/2001 | Nagase et al. ................ | 564/414 |
| 6,521,258 B1 | * | 2/2003 | Mandel et al. ............... | 424/484 |
| 6,632,878 B1 | | 10/2003 | Matsumoto et al. | |

FOREIGN PATENT DOCUMENTS

| | | |
|---|---|---|
| CN | 1188776 A | 7/1998 |
| EP | 0 506 067 A1 | 9/1992 |
| EP | 0 5096 067 A1 | 9/1992 |
| EP | 0841314 A1 | 5/1998 |
| EP | 0 854 165 A1 | 7/1998 |
| EP | 0 174 565 A1 | 2/2001 |
| EP | 1 074 565 A1 | 2/2001 |
| EP | 1074565 A1 * | 2/2001 |
| JP | 62-096553 | 5/1987 |
| JP | 3-197511 | 8/1991 |
| JP | 5-31000 A | 2/1993 |
| JP | 5-31000 A1 | 2/1993 |
| JP | 05097920 A * | 4/1993 |
| JP | 6-1853 A | 1/1994 |
| JP | 6-239929 | 8/1994 |
| JP | 8-34817 A | 2/1996 |
| JP | 8-034817 A | 2/1996 |
| JP | 08034817 A * | 2/1996 |
| JP | 10-265507 | 10/1998 |
| JP | 11349655 A * | 12/1999 |
| JP | 2001-81128 | 3/2001 |
| JP | 2001-114821 | 4/2001 |
| JP | 2001-323022 | 11/2001 |
| JP | 2002-003529 | 1/2002 |
| JP | 2002-187976 | 7/2002 |
| WO | WO 96/01304 | 1/1996 |
| WO | WO 96/01857 | 1/1996 |
| WO | WO 98/32533 | 7/1998 |
| WO | WO 98/32533 A1 | 7/1998 |
| WO | WO 00/68170 | 11/2000 |

OTHER PUBLICATIONS

O'Neill et al. "Solvent-Free Generation of Poly(Vinyl Acetals) Directly From Poly(Vinyl Acetate)", Polymer Engineering and Science; May 1999; vol. 39, No. 5 p. 862-871.*
XP-002401512 (JP 07-070355).

* cited by examiner

*Primary Examiner*—David Wu
*Assistant Examiner*—Michael M Bernshteyn
(74) *Attorney, Agent, or Firm*—Connolly Bove Lodge & Hutz LLP (57) ABSTRACT

It is an object of the invention to provide a method for producing a modified polymer compound and a production apparatus of a modified polymer capable of producing a modified polymer compound with a high purity in a short time, and such a modified polymer compound.

The invention provides a method for producing a modified polymer compound, which comprises chemically modifying a polymer compound in a supercritical fluid or a high temperature and high pressure fluid, said modified polymer compound being composed of monomer units obtainable by chemically modifying part of or all of monomer units composed of the polymer compound before modification reaction.

2 Claims, 2 Drawing Sheets

PROCESS FOR PRODUCING MODIFIED POLYMER, APPARATUS FOR PRODUCING MODIFIED POLYMER, AND MODIFIED POLYMER

TECHNICAL FIELD

The invention relates to a method for producing a modified polymer compound and a production apparatus of a modified polymer capable of producing a modified polymer compound with a high purity in a short time, and such a modified polymer compound.

BACKGROUND ART

Conventionally, in order to obtain a modified polymer compound by hydrolyzing a hydrolyzable group in a side chain of a polymer compound or newly bonding an addition reaction product to a main chain or a side chain, for example, methods for hydrolysis reaction and dehydration condensation reaction in the presence of an acidic catalyst or an alkaline catalyst have been employed.

For example, a large quantity of poly(vinyl alcohol) has been used as a raw material of alkylacetalized poly(vinyl alcohol) (hereinafter, also referred to as poly(vinyl acetal) resin) to be used as an intermediate film for laminated glass, an emulsifier, a molded product and an adhesive for various purposes. Poly(vinyl alcohol) is generally synthesized by saponification of poly(vinyl acetate) in the presence of an acidic catalyst or an alkaline catalyst.

The quality of poly(vinyl alcohol) is determined mainly based on the polymerization degree, the polymerization degree distribution, the saponification degree, the saponification degree distribution and the purity so-called pure component. In particular, the saponification degree and the pure component are particularly important and, depending on their values, problems that no intended property is obtained and that the property is deteriorated with the lapse of time may possibly occur. However, the saponification degree and the pure component of poly(vinyl alcohol) are in trade-off relation each other and, in order to improve the pure component, the amount of the acidic catalyst or the alkaline catalyst has to be decreased. Therefore, the desired saponification degree cannot be obtained to result in easy coloration of a product or it takes a long time for saponification to forcibly increase the saponification degree. Further, in order to remove the catalyst upon completion of the saponification reaction, the product compounds are commonly washed with a large quantity of water. However, it results in difficulty of increasing the product yield.

The poly(vinyl acetal) resin has been used for various purposes, for example, intermediate films for laminated glass, a wash primer for metal treatment, a variety of coating materials, adhesives, resin processing agents, and ceramic binders. Especially, laminated glass having an intermediate film made of the poly(vinyl acetal) resin is excellent in impact energy absorption property, transparency, and adhesion property to glass and is highly safe since fragments are not scattered at the time of break, so that the laminated glass has been used widely as window glass of traffic vehicles such as automobiles, window glass of buildings and the like. As described in Japanese Kokai Publication Hei-6-1853, the poly(vinyl acetal) resin is generally synthesized by dehydration condensation of poly(vinyl alcohol) and aldehyde in the presence of an acidic catalyst.

The acetalization degree and the purity of the obtained poly(vinyl acetal) resin greatly affect the properties of intermediate films of the poly(vinyl acetal) resin. That is, in the case where the purity of the poly(vinyl acetal) resin is low, it becomes impossible to obtain any intermediate film of the poly(vinyl acetal) resin having intended properties. Therefore, at the time of producing the poly(vinyl acetal) resin from poly(vinyl alcohol) by using an acidic catalyst, in order to increase the purity, washing with a large quantity of water is required and it results in low productivity.

To deal with such problems, method for producing modified polymer compounds without using any acidic catalyst or alkaline catalyst has been studied. For example, a method for modifying polymers at the time of extrusion molding of polymer compounds has been studied. It is a method for supplying a polymer compound together with a reactive monomer and a peroxide (a radical generating agent) to an extrusion molding apparatus to generate radical in the extrusion molding apparatus, thereby grafting polymers. However, with the method, the reaction system cannot be controlled since the reaction is promoted with the radical. Decomposition reaction of the main chain of the polymer compound is caused simultaneously with the grafting reaction to lead to problems such as decrease of the polymerization degree of the polymer compound or production of homopolymers of the reactive monomer as byproducts.

SUMMARY OF THE INVENTION

A first aspect of the invention is directed to a method for producing a modified polymer compound, which comprises chemically modifying a polymer compound in a supercritical fluid or a high temperature and high pressure fluid, said modified polymer compound being composed of monomer units obtainable by chemically modifying part of or all of monomer units composed of the polymer compound before modification reaction. According to the first aspect of the invention, particularly, the polymer compound before modification reaction has at least one hydrolyzable bond in a side chain and, said modified polymer compound is a hydrolysis product of the polymer compound before modification reaction. The invention is also employed in the case where the polymer compound before modification reaction has at least one reactive group in a side chain and/or a terminal and, said modified polymer compound being obtainable by reaction with a compound having a reactive group capable of causing reaction with the reactive group in the side chain and/or the terminal of the polymer compound before modification reaction, and having a new bond added to part of or all of the monomer units composing the polymer compound before modification reaction. In this case, the modification reaction is carrying out by reacting the polymer compound before the modification reaction with a compound having at least one reactive group capable of causing substitution reaction and/or addition reaction with a reactive group in a side chain and/or a terminus of said polymer compound before the modification reaction. The compound having at least one reactive group capable of causing substitution reaction and/or addition reaction with the reactive group in the side chain and/or the terminal of the polymer compound before modification reaction is preferably a polymer compound having reactive group in at least one terminal. The compound is also preferably a polymer compound having at least one reactive group in the side chain. The first aspect of the invention is also employed in the case where the modification reaction is carrying out by reacting the polymer compound before the modification reaction having a double bond site in the main chain with a compound having at least one reactive group capable of causing addition reaction with the double bond site existing in the main chain of the polymer compound before modification reaction. Further, the first aspect of the invention is employed in the case where the modification reaction is carrying out by reacting a polyolefin with a compound having a double bond in a supercritical fluid or a high temperature and high pressure fluid.

In the first aspect of the invention, the polymer compound before modification reaction is preferably in a melted, dissolved, dispersed or swollen state. The above-mentioned supercritical fluid or the high temperature and high pressure fluid is preferably at least one selected from the group consisting of water, an organic solvent and carbon dioxide. Further, the above-mentioned supercritical fluid or the high temperature and high pressure fluid is preferably a fluid in a liquid state at a normal temperature and normal pressure and heated and pressurized to a temperature of 100° C. or more and a pressure of 0.5 MPa or more.

In the case where the polymer compound before modification reaction has a condensable substituent group in the side chain and/or the terminal, the above-mentioned supercritical fluid or the high temperature and high pressure fluid is preferably either a compound having a reactive group capable of causing reaction with the reactive group in the side chain and/or the terminal of the polymer compound before modification reaction or a binary mixed fluid of a compound having a reactive group capable of causing reaction with the reactive group in the side chain and/or the terminal of the polymer compound before modification reaction and another fluid. Further the fluid is preferably a ternary mixed fluid of a compound having a reactive group capable of causing reaction with the reactive group in the side chain and/or the terminal of the polymer compound before modification reaction, another fluid and carbon dioxide. The compound having a reactive group capable of causing reaction with the reactive group in the side chain of the polymer compound before modification reaction is preferably an aldehyde and the above-mentioned aldehyde is more preferably an alkylaldehyde and/or formaldehyde.

A second aspect of the invention is directed to a production apparatus of a modified polymer being used for the method for producing a modified polymer compound of the first aspect of the invention, which comprises at least: a modification reaction container; a separator; a container for storing a fluid capable of being in a supercritical state or a high temperature and high pressure state; a supplier for supplying the fluid to the modification reaction container; a supplier for supplying the fluid containing a modified polymer compound to the separator; a heater for heating the modification reaction container; and a cooler for cooling the fluid containing the modified polymer compound. The production apparatus of a modified polymer according to the second aspect of the invention preferably has therein an obstacle for interfering the fluid flowing into the modification reaction container, a static mixer, or a plate having an orifice. Preferably, the production apparatus of the modified polymer compound according to the second aspect of the invention further comprises a heat exchanger between the liquid containing the modified polymer compound and the fluid capable of being in the supercritical state or the high temperature and high pressure state before supply to the modification reaction container; and further comprises a polymerization reactor and a supplier for supplying a polymerization reaction solution to the modification reaction container; and further comprises a preparation tank for melting, dissolving, dispersing or swelling the polymer compound before modification reaction as well as a supplier for supplying a raw material solution to the modification reaction container from the preparation tank.

A third aspect of the invention is directed to a modified polymer compound which is produced by the method for producing a modified polymer compound according to the first aspect of the invention or using the production apparatus of a modified polymer according to the second aspect of the invention. An example of the modified polymer compound according to the third aspect of the invention includes poly(vinyl alcohol) and, in this case, the compound is preferable to have a saponification degree of 60 to 100 mol %, a pure component 80% or more, and a transparence of the hydrolysis product 80% or more. The modified polymer compound according to the third aspect of the invention may further include poly(vinyl acetal) resin and poly(vinyl butyral) resin. An intermediate film for laminated glass which is obtainable by using the poly(vinyl acetal) resin or poly(vinyl butyral) resin, which is one of the third aspect of the invention, and a laminated glass which is obtainable by using the intermediate film for laminated glass are also included in the invention. A Ceramic binder, adhesive for printed circuit board, binder for ink, and wash primer which are obtainable by using the poly(vinyl acetal) resin or poly(vinyl butyral) resin of the invention are also included in the invention.

BRIEF DESCRIPTION OF THE DRAWING(S)

The production apparatus of FIG. 2 comprises a preparation tank or a polymerization reaction container 11, a modification reaction container 12, supplier 13 for supplying a prepared raw material solution or polymerization reaction solution to the modification reaction container 12, supplier 14a for continuously supplying a fluid which is possibly to be a supercritical fluid or a high temperature and high pressure fluid to the modification reaction container 12, heater 15 for making the fluid be in a supercritical fluid state or a high temperature and high pressure state by heating the reaction container 12, a heat exchanger 16 for cooling a fluid containing a modified polymer compound, and a separator 17 for separating and recovering the modified polymer compound from the fluid containing the cooled modified polymer compound. It is noted that 14c and 14d in FIG. 2 denote containers for the fluids. In the case of using a mixed fluid, fluids to be mixed are continuously supplied to the modification reaction container 12 from both supplier 14a and 14b. Additionally, heater 18 for heating the fluid may be provided.

The production apparatus of FIG. 1 comprises a reaction tube 1, a heater 2, a metal salt 3, a thermocouple 4, a metal salt melting bath 5, a preparation tank or a polymerization reaction container 11, a modification reaction container 12, supplier 13, supplier 14a, supplier 14b, a container 14c for a fluid, a container 14d for a fluid, heater 15, a heat exchanger 16, a separator 17, heater 18, a distillation tower 19, and a pressure adjustment valve 20.

DETAILED DISCLOSURE OF THE INVENTION

Hereinafter, the invention will be described in detail.

A method for producing a modified polymer compound according to the first aspect of the invention involves chemical modification of a polymer compound in a supercritical fluid or a high temperature and high pressure fluid. The reaction in the supercritical fluid or the high temperature and high pressure fluid can well promote the modification reaction with a high reaction rate even when the reaction is hard to be carried out by common modification reaction such as modification of a polymer compound in an extrusion molding apparatus. Further, since the modification reaction can be carried out without an acidic catalyst or an alkaline catalyst, an ion-free modified polymer compound with an extremely high purity can be obtained.

In this specification, the modification means chemically modifying a polymer compound and, for example, it practically includes reaction of hydrolyzing a polymer compound having a hydrolyzable bond in the side chain; reaction of forming carbon-carbon bond, ester bond, ether bond or amido bond in a part of or all of monomer units composing a polymer compound by condensation reaction, addition reaction, substitution reaction, or isolation reaction followed by polymerization reaction; and reaction of a polyolefin with a compound having double bond. In this specification, the modification also means modification reaction for obtaining a polymer compound, but not decomposition reaction of the main chain. The average polymerization degree of the resultant modified polymer compound is preferably ½ or more of the polymer compound before the modification.

The supercritical fluid or the high temperature and high pressure fluid to be used for the production method according to the first aspect of the invention may be appropriately selected depending on the structure of a polymer compound before the reaction and the structure of a modified polymer compound after the modification. As the supercritical fluid or the high temperature and high pressure fluid to be used in the first aspect of the invention, a mixed fluid may be used.

The above-mentioned supercritical fluid or high temperature and high pressure fluid is preferably at least one selected from the group consisting of water, an organic solvent, and carbon dioxide. They may be used alone or in form of a mixed fluid.

Water and/or carbon dioxide is preferable since it is a fluid easy to use, economical in terms of the cost and environment-friendly from a viewpoint of the effects on environments. Alcohols are also preferable because of the similar reasons.

In the case of using water alone as the above-mentioned supercritical fluid or high temperature and high pressure fluid, it may be possible that the reaction is promoted insufficiently because of the small solubility of a polymer compound. However, use of a mixed fluid obtained by adding an organic solvent or carbon dioxide to water makes it possible to improve the solubility of the polymer compound and well carry out hydrolysis reaction.

Examples of the above-mentioned organic solvent may include alcohols such as methanol, ethanol and isopropanol; and ketones such as acetone, methyl ethyl ketone and methyl phenyl ketone. Another examples of the organic solvent may include sulfoxides such as dimethyl sulfoxide; amines such as dimethylformamide; ethers such as diethyl ether and dimethyl ether; aromatic hydrocarbon such as toluene and xylene; and aliphatic hydrocarbons such as hexane and cyclohexane.

The temperature of the above-mentioned supercritical fluid or high temperature and high pressure fluid is preferably 100° C. or more, more preferably 100 to 700° C., further preferably 100 to 400° C., and particularly preferably 100 to 300° C. in the case where the fluid is a liquid at a normal temperature and normal pressure. When it is less than 100° C., the reaction may not be promoted sufficiently and, when it is more than 700° C., the energy required for increasing the temperature becomes extremely high and the energy loss becomes high, resulting in cost up and economical disadvantage. Further, a polymer compound to be a raw material may be decomposed. In the case of producing partially hydrolyzed poly(vinyl alcohol), the temperature of the above-mentioned supercritical fluid or high temperature and high pressure fluid is preferably 300° C. or less. When it is more than 300° C., the decomposition rate of the poly(vinyl alcohol) is so fast to make it difficult to obtain a partially hydrolyzed product.

The pressure of above-mentioned supercritical fluid or high temperature and high pressure fluid is preferably 0.5 to 100 MPa, more preferably 0.5 to 60 MPa in the case where the fluid is a liquid at a normal temperature and a normal pressure. When it is less than 0.5 MPa, the reaction may not be promoted sufficiently and, when it is more than 100 MPa, the energy required for the pressure increase become extremely high to result in an economical disadvantage.

It is preferable to use an excess amount of the above-mentioned supercritical fluid or high temperature and high pressure fluid in relation to the amount of the polymer compound. The extent of the excess amount of the above-mentioned supercritical fluid or high temperature and high pressure fluid is preferably at least equal to or more than the minimum amount of a reactive compound, the supercritical fluid or the high temperature and high pressure fluid which is theoretically required for obtaining an intended modified polymer compound, more preferably 1 to 1000 times as much. When the use amount is smaller than the theoretically required minimum amount, the reaction may not be promoted sufficiently and, when the use amount is more than 1000 times as much as the theoretically required minimum amount, the concentration of the modified polymer compound to be produced becomes extremely low and the reaction efficiency is decreased, resulting in economical disadvantage. It is further preferably 1 to 200 times as much.

In the case of obtaining a hydrolysis product from a polymer compound before modification reaction by the production method according to the first aspect of the invention, the polymer compound before modification reaction is preferably those having at least one hydrolyzable bond in the side chain. For example, compounds having at least one hydrolyzable bond selected from the group consisting of ester bond, ether bond and amido bond in the side chain are particularly preferable. Specific examples thereof include homopolymers or copolymers of monomers such as 2-(meth)acrylamido-2-methylpropanesulfonic acid, dimethylaminoethyl (meth)acrylate, 4-hydroxybutyl(meth)acrylate, t-butyl (meth)acrylate, 2-methoxyethyl(meth)acrylate, methyl (meth)acrylate, ethyl(meth)acrylate, isopropyl (meth)acrylate, n-butyl(meth)acrylate, 2-ethylhexyl (meth)acrylate, isobutyl(meth)acrylate, n-hexyl (meth)acrylate, lauryl(meth)acrylate, 2-hydroxymethyl (meth)acrylate, hydroxypropyl(meth)acrylate, 2-hydroxymethyl (meth)acrylate, hydroxypropyl (meth)acrylate, maleic acid, itaconic acid, (meth)acrylamide, N-methylol (meth)acrylamide, diacetone (meth)acrylamide, glycidyl(meth)acrylate, vinyl toluene, vinyl acetate, (meth)acrylonitrile, 1,4-buthanediol (meth)acrylate, diethylene glycol di(meth)acrylate, neopentyl glycol di(meth)acrylate, 1,6-hexanediol di(meth)acrylate, hydroxypivalic acid ester neopentyl glycol di(meth)acrylate, polyethylene glycol di(meth)acrylate, trimethylolpropane tri(meth)acrylate, pentaerythritol tri(meth)acrylate, dipentaerythritol tri(meth)acrylate, dimethylaminomethyl(meth)acrylate, tetrahydrofurfuryl(meth)acrylate, and trimethylolpropane tri(meth)acrylate.

Examples of a modified polymer compound produced from a polymer compound selected from these polymer compounds before the reaction as a raw material by the production method according to the first aspect of the invention may include poly(vinyl alcohol), polyacrylic acid, poly(ethyl methacrylate) and polymer compounds having two or more kinds of substituents such as hydroxyl and carboxyl group. It may further include copolymers obtained by copolymerization of other monomers such as styrene and α-methylstyrene.

In order to obtain the modified polymer compound by adding carbon-carbon bond, ester bond, ether bond or amido bond to a part of or all of monomer units composing the polymer compound before modification reaction by the production method according to the first aspect of the invention, the above-mentioned polymer compound before modification reaction is preferably those having at least one reactive group in the side chain and/or the terminal, for example, compounds having hydroxyl group, carboxyl group, an amino group, a sulfonic acid group, a mercapto group, nitryl group, a halogen group, a chlorosulfonic acid group, an isocyanate group, methylol group, an epoxy group, an imido group, vinyl group, methacryloyl group, acryloyl group, a silanol group, and a silyl ester group and compounds having at lest one double bond. The above-mentioned compound having at least one silane group may be polymers.

Examples of the above-mentioned polymer compound before modification reaction may include macromonomers such as poly(vinyl alcohol), poly(meth)acrylic acid, poly(meth)acrylamide, amino-terminated polyamide, carboxyl-terminated polyamide, carboxyl-terminated polyesters and hydroxy-terminated polyesters, and polymer compounds having at least an epoxy group, a vinyl group, an amino group, hydroxyl group, methacryloyl group, acryloyl group and silanol group.

Examples of the above-mentioned polymer compound having at least one epoxy group may include bisphenol type epoxy resins such as bisphenol A type epoxy resin, bisphenol F type epoxy resin, bisphenol AD type epoxy resin and bisphenol S type epoxy resin; phenol novolak type epoxy resin; aromatic epoxy resins such as trisphenolmethane triglycidyl ether and their hydrogenated compounds and bromides; alicyclic epoxy resins such as 3,4-epoxycyclohexylmethyl-3,4-epoxycyclohexanecarboxylate, 3,4-epoxy-2-methylcyclohexylmethyl-3,4-epoxy-2-methylcyclohexanecarboxylate, bis(3,4-epoxycyclohexyl) adipate, bis(3,4-epoxycyclohexylmethyl)adipate, 2-(3,4-epoxycyclohexyl-5,5-spiro-3,4-epoxy)cyclohexanone-meth-dioxane, bis(2,3-epoxycyclopentyl) ether (trade name: EHPH-3150, manufactured by Daicel Chemical Industries Ltd.); aliphatic epoxy resins such as 1,4-butanediol diglycidyl ether, 1,6-hexanediol diglycidyl ether, glycerin triglycidyl ether, trimethylolpropane triglycidyl ester, polypropylene glycol diglycidyl ether, and polyglycidyl ethers with polyols including polyoxyalkylene glycols having alkylene groups of 2 to 9 carbon atoms (preferably 2 to 4 carbon atoms) and polytetramethylene ether glycols; glycidyl ester ester type epoxy resins and their hydrogenated compounds such as phthalic acid diglycidyl ester, tetrahydrophthalic acid diglycidyl ester, hexahydrophthalic acid diglycidyl ester, diglycidyl-p-oxybenzoic acid, salicylic acid glycidyl ether glycidyl ester, dimer acid glycidyl ester; glycidylamine type epoxy resin such as N,N'-diglycidyl derivatives of cycloalkyleneureas, N,N,O-triglycidyl derivatives of p-aminophenol, and N,N,O-triglycidyl derivatives of m-aminophenol, and their water-based additives; random copolymers of glycidyl (meth)acrylate with radical polymerization type monomers such as ethylene, vinyl acetate, styrene, and (meth)acrylic acid esters such as poly(methyl methacrylate); polymers obtained by epoxylation of double bonds of unsaturated carbons existing in polymers mainly comprising conjugated diene compounds such as epoxylated polybutadiene or their partially hydrogenated compounds; polymers obtained by epoxylation of double bonds of unsaturated carbons of conjugated diene compounds existing in block copolymers comprising "polymer blocks of mainly aromatic vinyl compounds" such as epoxylated styrene-butadiene-styrene copolymers and "polymer blocks of mainly conjugated diene compounds or their partially hydrogenated compound-based polymer blocks" in a single molecule; polyester resins having one or more epoxy group in one molecule; urethane-modified epoxy resins and polycaprolactone-modified epoxy resins obtained by introducing urethane bond or polycaprolactone bond into the structure of the above-mentioned various epoxy group-containing compounds; and rubber-modified epoxy resins obtained by adding rubber components such as NBR, CTBN, polybutadiene and acrylic rubber to the above-mentioned various epoxy group-containing compounds. These polymer compounds having at least one epoxy group may be used alone or two or more of them may be used in combination.

The above-mentioned macromonomers are not particularly limited, and examples thereof may include glycidyl methacrylate-polypropylene graft copolymers, glycidyl methacrylate-poly(methyl methacrylate) graft copolymers, glycidyl methacrylate-butyl acrylate block copolymers, and glycidyl methacrylate-polystyrene block copolymers.

Reaction of such a polymer compound having a reactive group in the side chain and/or the terminal together with a compound having a reactive group (hereinafter, also referred to as a reaction compound) capable of causing reaction with the reactive group in the side chain and/or the terminal of the polymer compound is caused in a supercritical fluid or a high temperature and high pressure fluid to obtain a modified polymer compound wherein carbon-carbon bond, ester bond, ether bond or amido bond is added to a part of or all of the monomer units composing the polymer compound before modification reaction.

Examples of the above-mentioned reaction compound may include compounds having at least one reactive group selected from the group consisting of hydroxyl group, carboxyl group, an amino group, a sulfonic acid group, a mercapto group, nitryl group, a halogen group, a chlorosulfonic acid group, an isocyanate group, methylol group, an epoxy group, an imido group, vinyl group, methacryloyl group, acryloyl group, a silanol group, and a silyl ester group.

Examples of the above-mentioned compound having hydroxyl group may include alcohols, and examples of the alcohols may include methanol, ethanol, isopropanol and diols such as ethyleneglycol, diethyleneglycol, 1,2-propyleneglycol, 1,3-propyleneglycol, 1,3-butanediol, α-methylbutanediol, α-dimethylbutanediol, 1,5-pentanediol, 3-methylpentanediol, 1,6-hexanediol, 1,8-octanediol, cyclobutane-1,3-di(2'-ehanol), 1,4-dihydroxyhexane, cyclohexane-1,4-dimethanol, 1,10-decanediol, 1,12-dodecanediol, and neopentylglycol. Examples of the above-mentioned compound having carboxyl group may include carboxylic acids, and examples of the carboxylic acids may include formic acid, acetic acid, propionic acid, butyric acid, valeric acid, caproic acid, capric acid, phenylacetic acid, benzoic acid, phthalic acid, toluic acid, aminobenzoic acid, succinic acid, glutaric acid, adipic acid, pimelic acid, suberic acid, azelaic acid, sebacic acid, 1,12-dodecanedioic acid, 1,4-cyclohexanedicarboxylic acid, 1,3-cyclopentanedicarboxylic acid, 2-methylsuccinic acid, 2-methylpentanedioic acid, 3-methylhexanedioic acid, terephthalic acid, isophthalic acid, 4,4'-diphenylmethanedicarboxylic acid, 4,4'-diphenyl ether dicarboxylic acid, 4,4'-diphenyl thioether dicarboxylic acid, and 4,4'-diphenylaminedicarboxylic acid. Examples of the above-mentioned compound having an aldehyde group may include aldehydes, and examples of the aldehydes may include formaldehyde, acetaldehyde, phenylacetaldehyde, and benzaldehyde. Examples of the above-mentioned compound having a ketone group may include ketones, and examples of the ketones include acetone, methyl ethyl ketone, methyl isobutyl ketone, pentanone, hexanone, and acetophenone. Examples of the above-mentioned compound having an amino group may include amines, and examples of the amines may include methylamine, dimethylamine, trimethylamine, ethylamine, isobutylamine, benzylamine, phenylethylamine, urea, and aniline. An example of the above-mentioned compound having nitryl group may include acetonitrile. Examples of the above-mentioned compound having a halogen group may include dichloro-p-xylene, chloroform and the like.

The above-mentioned reaction compound may be a polymer compound which may be polyfunctional. In the case where a polymer compound having a reactive group in at least one terminal is used as the above-mentioned reaction compound, the resultant modified polymer compound is a graft copolymer wherein a polymer chain is bonded at the site of the reactive group in the side chain of the polymer compound before reaction. In the case where a polymer compound having at least one reactive group in the side chain is used as the above-mentioned reaction compound, the resultant modified polymer compound is a cross-linked polymer wherein polymer compounds are bonded to each other through side chains.

Examples of a modified polymer compound produced by reaction of the polymer compound before modification reaction having at least one reactive group in the side chain with the reaction compound in the supercritical fluid or the high temperature and high pressure fluid may include poly(vinyl acetate), poly(meth)acrylamide, poly[2-(meth)acrylamido-2-methylpropanesulfonic acid], poly[diethylaminoethyl (meth)acrylate], poly[methyl (meth)acrylate], poly[isobutyl (meth)acrylate], poly(vinyl acetal) resins, methoxymethylated polyamides, modified epoxy resins, o-cresol-novolak type epoxy resins and the like. Further, by controlling the modification degree, polymer compounds having two or more types of substituent groups such as poly (vinyl acetal) resins obtained by reaction of poly(vinyl alcohol) with two kinds of aldehydes can be obtained.

In the case of reaction of the above-mentioned polymer compound having the reactive group in the side chain with the above-mentioned reaction compound, if possible, it is preferable to use the reaction compound as the above-mentioned supercritical fluid or high temperature and high pressure fluid. In the supercritical fluid or high temperature and high pressure fluid, the activation energy for reaction is lowered and, also, the kinetic energy is increased, so that collision probability of reaction can be increased and, thus, the reaction is easily promoted as compared with the reaction under normal conditions. In the case of using water, in addition to such advantageous characteristics, the ion product of water at a high temperature and high pressure is increased several hundred to thousand times as high as that of water at a normal temperature; therefore, proton is easily supplied from water. Accordingly, the acid-base reaction can easily be promoted. In the case of producing a poly(vinyl acetal) resin by reaction of poly(vinyl alcohol) as a raw material with an aldehyde according to the production method of the first aspect of the invention, although poly(vinyl alcohol) is scarcely dissolved in the aldehyde, the solubility of poly(vinyl alcohol) in a mixed fluid can be increased by using water and the aldehyde as the mixed fluid; therefore, the modification reaction is easily promoted.

The mixed fluid is further preferably a mixed fluid comprising the reaction compound, water and carbon dioxide. In the above-mentioned mixed fluid of the reaction compound, water and carbon dioxide, the solubility of carbon dioxide in water can be changed depending on the temperature and the pressure at the time of reaction; therefore, fluctuation of pH in the reaction system can be remarkably suppressed as compared with that in the case of using water alone. Accordingly, such a mixed fluid is especially useful in the case where the pH fluctuation has to be suppressed to considerably slight as the condition of the reaction system.

In the case where reaction of a polyolefin with a compound having double bond is caused according to the production method of the first aspect of the invention, the above-mentioned polyolefin is not particularly limited and examples thereof may include polyethylene resins such as low density polyethylene, middle density polyethylene, high density polyethylene, and linear chain low density polyethylene; polypropylene resins such as propylene homopolymer, propylene random polymer, and propylene block polymer; diene type elastomers such as polybutadiene, polyisoprene, and their hydrogenated products; olefin type elastomers such as ethylene-propylene copolymer, ethylene-propylene-1-butene ternary copolymer, and ethylene-propylene-diene ternary copolymer; modified olefin type resins such as ethylene-vinyl acetate copolymer, ethylene-maleic anhydride copolymer, ethylene-(meth)acrylic acid copolymer, ethylene-(meth)acrylic acid ester copolymer, and ethylene-(meth)acrylic acid ester-maleic anhydride ternary copolymer; and styrene type block elastomers such as styrene-butadiene-styrene block copolymer, styrene-isoprene-styrene block copolymer, and their hydrogenated products. In particular, polyethylene resins and polypropylene resins are more preferable to use. These polyolefins may be used alone or two or more of them may be used in combination.

The above-mentioned compound having double bond is not particularly limited as long as it has at least one polymerizable double bond, and examples thereof may include acrylic acid or methacrylic acid esters such as methyl(meth)acrylate, ethyl(meth)acrylate, n-butyl (meth)acrylate, isobutyl(meth)acrylate, n-octyl (meth)acrylate, 2-ethylhexyl(meth)acrylate, stearyl (meth)acrylate, 2-chloroethyl(meth)acrylate, phenyl (meth)acrylate, benzyl(meth)acrylate, methyl-α-chloro (meth)acrylate, glycidyl(meth)acrylate, and tetrahydrofurfuryl(meth)acrylate; acrylonitrile and methacrylonitrile; maleimides such as phenylmaleimide and cyclohexylmaleimide; aliphatic acid vinyl esters such as vinyl acetate and vinyl versatic acid ester; vinyl ethers such as ethyl vinyl ether and butyl vinyl ether; vinyl halides such as vinyl chloride, vinylidene chloride, and vinyl bromide; ethylene, propylene, 1-butene, 2-buthene, and butadiene; styrene derivatives such as styrene and α-methylstyrene; and silanol and organosilicon compounds having Si—O—C bond in molecule, which are also vinyl type polymerizable monomer having one or more polymerizable unsaturated bonds in one molecule, such as vinyltrimethylsiloxane, vinyltrichlorosilane, allyltrichlorosilane, methylvinyldichlorosilane, divinyldichlorosilane, allylmethyldichlorosilane, dimethylvinylchlorosilane, chloromethyldimethylvinylsilane, allyldimethylchlorosilane, allyldimethylsilane, trimethylvinylsilane, trimethylvinyloxysilane, methoxydimethylvinylsilane, trimethoxyvinylsilane, diallyldichlorosilane, dimethyldivinylsilane, allyloxychloromethyldimethylsilane, allyltrimethylsilane, allyloxytrimethylsilane, ethoxydimethylvinylsilane, allylaminotrimethylsilane, methyltrivinylsilane, diacetoxymethylvinylsilane, allyloxydimethylvinylsilane, diethylmethylvinylsilane, diethoxymethylvinylsilane, bis(dimethylamino)methylvinylsilane, phenylvinyldichlorosilane, tetravinylsilane, triacetoxyvinylsilane, 3-(meth)acryloxypropylmethyldichlorosilane, 3-chloropropylmethyldivinylsilane, diallyldimethylsilane, diethoxydivinylsilane, dimethylethylmethylketoxyvinylsilane, butyldimethylvinylsilane, dimethylisobutoxyvinylsilane, triethoxyvinylsilane, trimethyl-3-vinylthiopropylsilane, allyloxy-2-aminoethylaminomethyldimethylsilane, allylphenyldichlorosilane, methylphenylvinylchlorosilane, methylphenylvinylsilane, dimethylisopentyloxyvinylsilane, 2-allyloxyethylthiomethyltrimethylsilane, allyltriethoxysilane, 3-allylaminopropyltrimethoxysilane, 4-bromophenyldimethylvinylsilane, dimethylphenylvinylsilane, 3-aminophenoxydimethylvinylsilane, 4-aminophenoxydimethylvinylsilane, methyltriisopropenoxysilane, 3-(meth)acryloxypropyldimethoxymethylsilane, 3-(meth)acrylopropyltrimethoxysilane, dimethylpiperidinomethylvinylsilane, dimethyl-2-[(2-ethoxyethoxy)ethoxy]vinylsilane, dimethylmethylphenylsilane, dimethyl-p-tolylvinylsilane, dimethyl-p-anisylvinylsilane, tris(1-methylvinyloxy)vinylsilane, allyldimethylpiperidinomethylsialne, triisopropoxyvinylsilane, tris(2-methoxyethoxy)vinylsilane, phenyltrivinylsilane, tetraallyloxysilane, diallylmethylphenylsilane, diethoxy-2-piperidinoethoxyvinylsilane, diphenylvinylchlorosilane, tributylvinylsilane, diphenylmethylvinylsilane, 3-dimethylvinylphenyl-N,N-diethylcarbanatodiphenyldivinylsilane, diallyldiphenylsilane, triphenylvinylsilane, triphenoxyvinylsilane, 1,3-divinyl-1,1,3,3-tetramethyldisiloxane, 1,3-divinyl-1,1,3,3-tetramethyldisilazane, 1-(4-methylpiperidinomethyl)-1,1,3,3-tetramethyl-3-vinyldisiloxane, 1,4-bis(dimethylvinylsilyl)benzene, 1,4-bis(dimethylvinylsiloxy)benzene, 1,3-bis(dimethylvinylsiloxy)benzene, 1,1,3,3-tetraphenyl-1,3-divinyldisiloxane, 1,3,5-trimethyl-1,3,5-trivinylcyclotrisiloxane, 1,3,5,7-tetramethyl-1,3,5,7-tetravinylcyclotetrasiloxane, and tetrakis(dimethylvinylsiloxymethyl)methane. These hydrophobic vinyl type monomers may be used alone or two or more of them may be used in combination.

In the production method of the first aspect of the invention, if necessary, an acidic or alkaline catalyst may be added to the supercritical fluid or the high temperature and high pressure fluid. The addition amount of the catalyst may be extremely slight and addition of the catalyst can further increase the reaction rate and the reaction efficiency. Examples of the above-mentioned acidic catalyst may include hydrochloric acid, nitric acid, sulfuric acid and the like. Examples of the above-mentioned alkaline catalyst may include sodium hydroxide, potassium hydroxide, ammonia and the like.

The above-mentioned polymer compound before modification reaction may be used in form of a monomer to be polymerized or an already polymerized compound and is preferably used in a dissolved or swollen state. Use of the compound in the dissolved or swollen state leads to a higher efficiency of the reaction.

As a polymerization method for obtaining the above-mentioned polymer compound before modification reaction, any optional polymerization method such as bulk polymerization, solution polymerization, emulsion polymerization, suspension polymerization, soap-free polymerization, and polymerization in a supercritical fluid can be employed.

Figure 1:
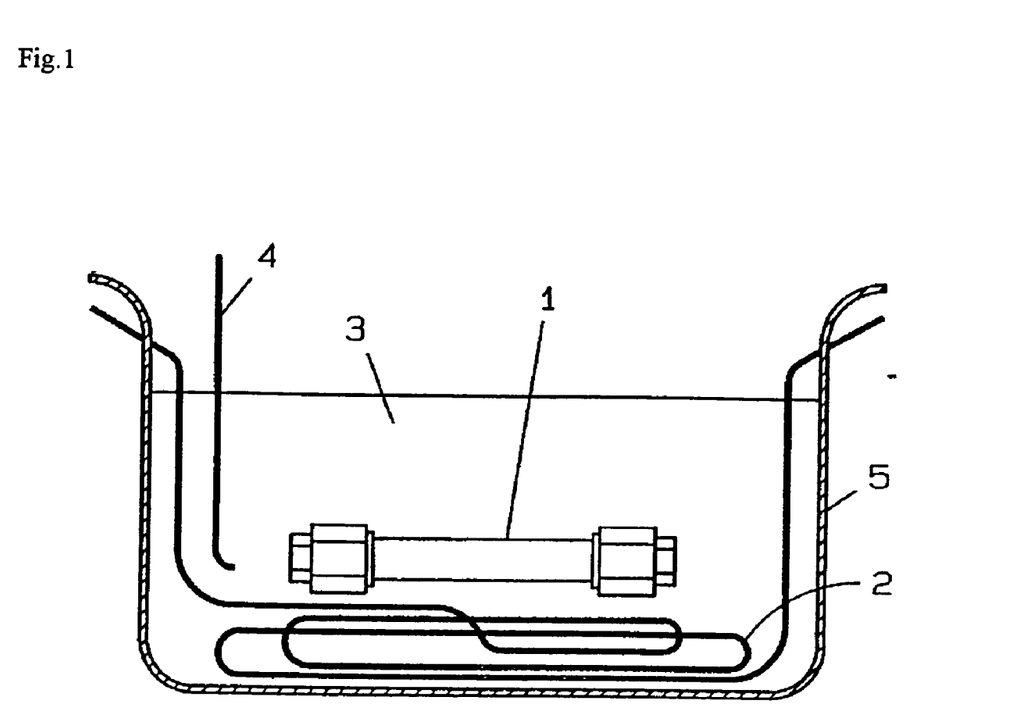
FIG. 1 is a schematic view for describing one example of reaction of the invention and FIG. 2 is a schematic view illustrating one example of a production apparatus of the invention.

The first aspect of the invention can be carried out by using, for example, a simple apparatus as shown in FIG. 1. The modification reaction using the apparatus shown in FIG. 1 will be described by way of a case of producing poly(vinyl acetal) resin from poly(vinyl alcohol) as the polymer compound before modification reaction and either an alkylaldehyde or formaldehyde as the reaction compound.

At first, a poly(vinyl alcohol) solution or dispersion containing poly(vinyl alcohol), either an alkylaldehyde or formaldehyde and, if on necessity, a mixed fluid of water, an organic solvent and/or carbon dioxide is loaded into a reaction tube 1 and sufficiently sealed. Then, the reaction tube 1 is inserted into a metal salt molten bath 5 which stores a metal salt 3 heated and melted by a heater 2 and whose temperature is measured by a thermocouple 4, and the temperature and the pressure of the fluid are controlled to be in a predetermined supercritical region or high temperature and high pressure region to start the condensation reaction. After the reaction is carried out for a predetermined duration, the reaction tube 1 is quickly put in a cooling bath and cooled rapidly. After cooling is sufficiently carried out, the produced substances in the reaction tube 1 are taken out and mixed with water to precipitate polyvinyl acetal) resin which is separated by filtration and dried.

A second aspect of the invention is directed to a production apparatus being used for the method for producing a modified polymer compound according to the first aspect of the invention, and the apparatus for producing the modified polymer compound comprises at least a modification reaction container, a separator, a container for storing a fluid which is possibly to be in the supercritical state or the high temperature and high pressure state, a supplier for supplying the fluid to the modification reaction container, a supplier for supplying the fluid containing a modified polymer compound to the separator, a heater for heating the modification reaction container, and a cooler for cooling the fluid containing the modified polymer compound. Use of such an apparatus makes it possible to continuously produce a large quantity of the modified polymer compound.

As the above-mentioned modification reaction container, a container made of a suitable material and having a sufficient thickness to be durable under severe reaction conditions of the supercritical or almost supercritical state since the reaction is carried out such severe conditions.

Examples of the material for the above-mentioned modification reaction container may include special steels such as carbon steel, Ni, Cr, V and Mo, austenite type stainless steels, Hastelloy, titanium, steel materials obtained by lining these steels with glass, ceramic or carbide, and steel materials clad with other metals.

The shape of the above-mentioned modification reaction container is not particularly limited, and a bath type, a tubular type or a special shape type container may be used. However, since the container is required to be heat resistant and pressure resistant, the bath type or tubular type container is preferable. In the case of batch type reaction, an autoclave or a tubular reaction tube is preferable. It is noted that, as the tubular type one, a linear tube may be used and, also, a tube having a structure formed by winding in a coil-shape or curving in U-shape form may be used.

It is preferable to place metal balls or an obstacle with a predetermined shape in the above-mentioned modification reaction container so as to generate turbulent flow. If such metal balls are placed in the modification reaction container, turbulent flow is generated by shaking; consequently, the stirring efficiency is heightened and the reaction efficiency is increased. Further, if the modification reaction container is filled with the metal balls or the like, the stirring efficiency is heightened only by shaking the container; therefore, it is preferable.

The filling ratio of the above-mentioned metal balls is preferably 20 to 80%. When it is out of the range, the stirring efficiency is deteriorated. If two or more types of metal balls with different diameters are used, the filling ratio can be improved. Accordingly, the stirring efficiency can be increased; therefore, it is preferable.

In addition, the above-mentioned modification reaction container is preferably provided with a plate having an orifice. If the modification reaction container is provided with the plate having an orifice, turbulent flow is generated by shaking; consequently, the stirring efficiency is heightened and the reaction efficiency is increased.

In the production apparatus of the modified polymer according to the second aspect of the invention, the polymer compound before modification reaction as the raw material may be supplied while being polymerized immediately before the reaction by combining means for polymerizing monomers or in form of an already synthesized polymer.

In the case where the polymer compound before modification reaction as the raw material is supplied while being polymerized immediately before the reaction by combining means for polymerizing monomers, the production apparatus of the modified polymer according to the second aspect of the invention is preferably provided further with a polymerization reactor and a supplier for supplying a polymerization reaction solution to the polymerization reactor. As soon as monomers are supplied to the polymerization reactor, polymerization reaction is carried out and the resultant polymerization reaction solution is continuously supplied to the modification reaction container, whereby a modification reaction products can be obtained further efficiently.

In the case where the already synthesized polymer is used as the polymer compound before modification reaction to be a raw material, the production apparatus of the modified polymer according to the second aspect of the invention is preferably provided further with a preparation tank for melting, dissolving, dispersing or swelling the polymer compound, and the supplier for supplying a prepared raw material solution to the modification reaction container.

As the above-mentioned preparation tank or the polymerization reaction container, a common bath type or tubular type polymerization reactor may be employed.

Figure 2:
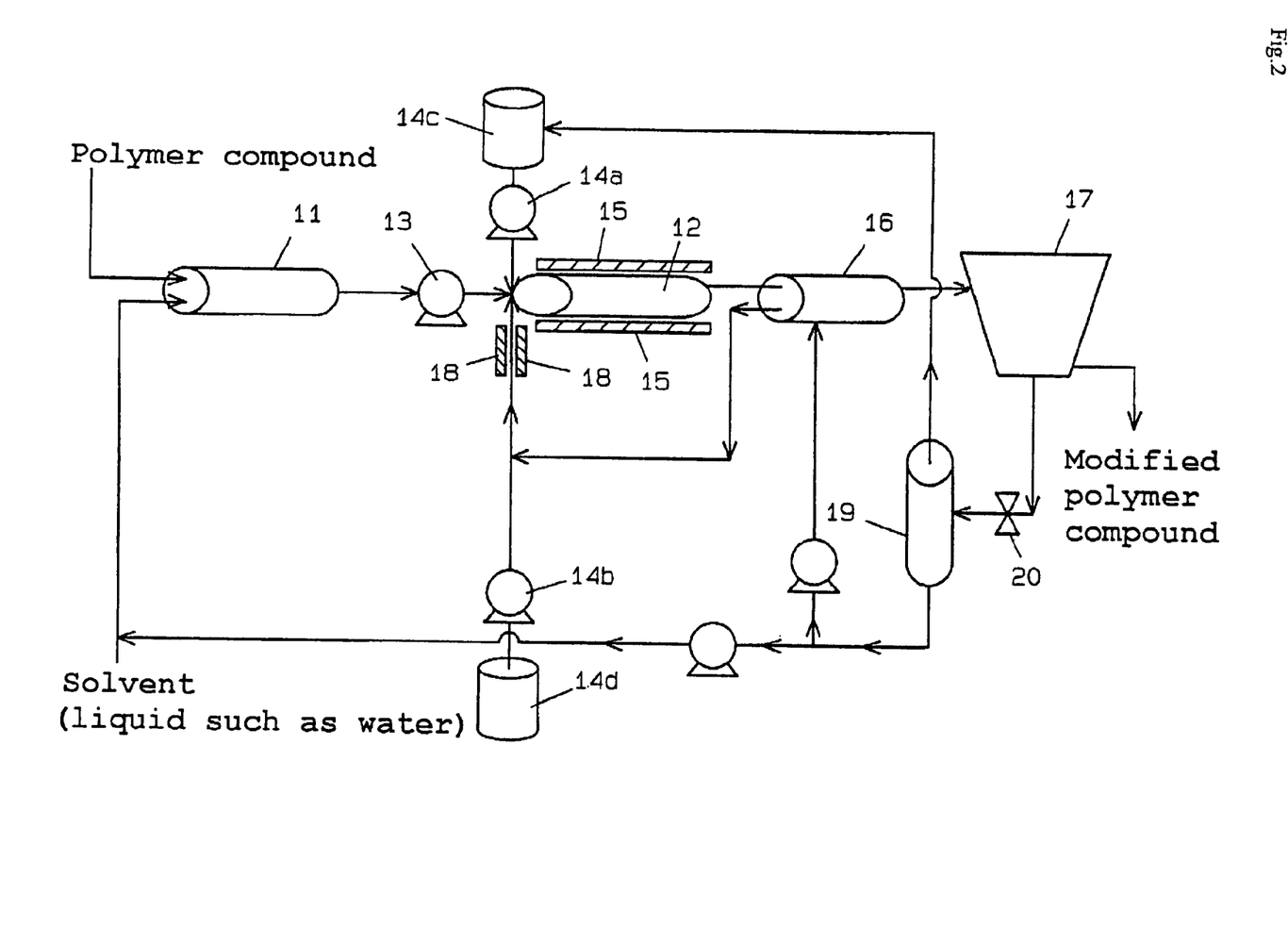

One embodiment of the production apparatus of the modified polymer according to the second aspect of the invention is illustrated in FIG. 2. The production apparatus illustrated in FIG. 2 comprises a preparation tank or a polymerization reaction container 11, a modification reaction container 12, supplier 13 for supplying a prepared raw material solution or polymerization reaction solution to the modification reaction container 12, supplier 14a for continuously supplying a fluid which is possibly to be a supercritical fluid or a high temperature and high pressure fluid to the modification reaction container 12, heater 15 for making the fluid be in supercritical fluid state or high temperature and high pressure state by heating the reaction container 12, a heat exchanger 16 for cooling a fluid containing a modified polymer compound, and a separator 17 for separating and recovering the modified polymer compound from the fluid containing the cooled modified polymer compound. It is noted that 14c and 14d in FIG. 2 denote containers for the fluids. In the case of using a mixed fluid, fluids to be mixed are continuously supplied to the modification reaction container 12 from both supplier 14b and heater 18 for heating the fluid may be provided additionally.

Using the production apparatus illustrated in FIG. 2, the first aspect of the invention will be carried out as follows.

The polymer compound before modification reaction is melted, dissolved, dispersed, swollen or polymerized in the preparation tank or the polymerization reaction container 11, then, the prepared raw material solution or the polymerization reaction solution is supplied to the modification reaction container 12 by supplier 13 such as a high pressure pump and, through another line, a fluid which is possibly to be a supercritical fluid or a high temperature and high pressure fluid is supplied by supplier 14a such as a high pressure pump. Next, the supercritical fluid or high temperature and high pressure fluid kept at a predetermined temperature and pressure by the heater 18 such as a heater is continuously supplied to the modification reaction container 12 for carrying out modification reaction of the polymer compound; the resultant solution containing the modified polymer compound is supplied to the heat exchanger 16 to be cooled to a room temperature; and the cooled solution containing the modified polymer compound is supplied to the separator 17 such as a liquid cyclone to obtain the modified polymer compound. The modification reaction container 12 may be held at a reaction temperature by the heater 15 such as a heater, so that the intended reaction can be carried out within a predetermined time. In such a manner, the modified polymer compound can be continuously synthesized. In the case where the fluid to be used is a mixed fluid, the supercritical fluid or high temperature and high pressure fluid is supplied by supplier 14b such as a high pressure pump.

If compounds inferior in the heat stability are used, the production apparatus illustrated in FIG. 2 is preferably employed. That is, among the respective raw materials to be loaded into the modification reaction container, only the fluids to be the supercritical fluid or high temperature and high pressure fluid are preferable to be heated to a high temperature as needed or more in the modification reaction container. If the fluids are at a high temperature, even when other raw materials to be mixed are at a low temperature, the inside of the modification reaction container can be adjusted to be at an intended temperature. Further, in FIG. 2, the modification reaction container can be heated by the heater so as to keep the fluids in supercritical state or high temperature and high pressure state. Accordingly, in the case where the temperature control of the modification reaction container is difficult and the inside of the modification reaction container is partially over-heated, conventionally compounds would be decomposed in some cases if the compounds are inferior in the heat stability. However, even when such compounds susceptive to heat are to be used, in the case only the fluid are heated to a high temperature and the modification reaction container is not heated or slightly heated so as to prevent the temperature decrease of the fluids, the reaction can be promoted while the inside of the modification reaction container being prevented from overheating.

For example, in the case where poly(vinyl alcohol) is acetalized by using an aldehyde inferior in the heat stability in the apparatus shown in FIG. 2, the pipeline from the preparation tank or the polymerization reaction container 11 to the modification reaction container 12 is no need to be heated. It is noted that the pipeline may be heated to a temperature at which no thermal decomposition may occur; accordingly, the temperature can be kept at a level necessary for the reaction by the fluid to be supplied to the modification reaction container. Consequently, the temperature decrease of the fluid to be mixed can be suppressed. Also in the case where a substance such as aldehydes, which are problematic in the heat stability (aldehydes are aldol-condensed by acetalization at a high temperature) is used as the supercritical fluid or high temperature and high pressure fluid, at first, a fluid such as water, which has no problem in the heat stability, is heated to a high temperature and supplied in form of a mixed fluid to the modification reaction container or mixed in the modification reaction container so as to promote the reaction without overheating the aldehydes.

In the production apparatus according to the second aspect of the invention, it is preferable to carry out heat exchange between the modified polymer compound-containing solution discharged out of the modification reaction container and the above-mentioned fluid before supply to the modification reaction container. The production apparatus preferable for such a case is used if the fluid is a liquid. For example, the apparatus illustrated in FIG. 2, a distillation tower 19 for distilling a liquid recovered by the separator 17 is provided. The fluid recovered from the distillation tower 19 is led to the above-mentioned heat exchanger 16 and heat-exchanged with the solution or dispersion of the modified polymer compound discharged out of the modification reaction container 12. In this production apparatus, after the liquid is separated from the modified polymer compound by the separator 17, the recovered liquid is discharged via a pressure adjustment valve 20 and supplied to the distillation tower 19. Then, the distillation tower 19 separates the mixed fluid into respective fluids and recovers the respective fluids. The recovered fluid is led to the above-mentioned heat exchanger 16 and heat-exchanged with the high temperature solution containing the polymer compound discharged from the modification reaction container 12 to the heat exchanger 16 and the fluid heated to a high temperature by the heat exchange is turned back to the modification reaction container 12 for the modification reaction of the polymer compound. In such a manner, since heat exchange is carried out between the fluid capable of being the supercritical fluid or high temperature and high pressure fluid and the fluid containing the modified polymer compound discharged at a high temperature, the energy can be utilized efficiently. In the production method according to the first aspect of the invention, a catalyst (such as hydrochloric acid or nitric acid), which is conventionally needed, is made no need at all or slightly needed, so that the recovery process involving distillation or the like can be simplified to a rather significant extent. Accordingly, the polymer compound containing an extremely little amount of remaining ion or ion-free and high purity can be obtained.

Since the production apparatus according to the second aspect of the invention is a circulation type apparatus where the polymer compound as a raw material and the fluid capable of being the supercritical fluid or high temperature and high pressure fluid are continuously supplied for carrying out the reaction, the productive efficiency is extremely high and, in addition to that, since the reaction rate is fast, the reaction can be completely carried out before byproducts are produced at a low reaction rate. Accordingly, production of the byproducts and thermal decomposition products can be suppressed.

A third aspect of the invention is directed to a modified polymer compound produced by the method for producing a modified polymer compound according to the first aspect of the invention or by the production apparatus of the modified polymer according to the second aspect of the invention.

The method for producing a modified polymer compound according to the first aspect of the invention or the production apparatus of the modified polymer according to the second aspect of the invention are especially preferable for producing poly(vinyl alcohol) from poly(vinyl acetate) and, also, preferable for producing poly(vinyl acetal) resin from poly(vinyl alcohol).

Hereinafter, the case of producing poly(vinyl alcohol) from poly(vinyl acetate) by employing the production method and the production apparatus of the invention will be described. Thereafter, the case of producing poly(vinyl acetal) resin from poly(vinyl alcohol) will be described.

Using poly(vinyl acetate) as a raw material, hydrolysis reaction is carried out according to the production method of the first aspect of the invention to obtain poly(vinyl alcohol).

The above-mentioned poly(vinyl acetate) can be synthesized by any optional polymerization method such as bulk polymerization, solution polymerization, emulsion polymerization, and polymerization in a supercritical fluid. In the case of a continuous polymerization method carried out by performing polymerization reaction continuously in a tubular polymerization reactor and introducing the polymerization reaction solution continuously into the modification reaction container, the polymerization degree and the polymerization degree distribution of the synthesized polymer become stable. Accordingly, when saponification is carried out in a supercritical fluid or a high temperature and high pressure fluid, poly(vinyl alcohol) with a high saponification degree and high purity can be synthesized efficiently in a short time.

The average polymerization degree of the poly(vinyl acetate) to be used as the raw material is preferably 100 to 4000. The average polymerization degree of the above-mentioned poly(vinyl acetate) can be determined accordingly to "Testing method of poly(vinyl acetate)", JIS K 6725.

The poly(vinyl alcohol) obtained by the method for producing a modified polymer compound according to the first aspect of the invention may be used as a raw material for a poly(vinyl acetal) resin usable for intermediate films of laminated glass. In this case, the required qualities of the poly (vinyl alcohol) are little volatile component, high pure component and transparency, satisfactory saponification degree, polymerization degree, crystallinity, and acetyl group-blocking property and desired ratio of the remaining metal. If these required qualities are not satisfied, no intended intermediate film for laminated glass can be obtained. The production method according to the first aspect of the invention can provide intended poly(vinyl alcohol).

The preferable physical properties of a raw material of the poly(vinyl acetal) resin to be used for the intermediate film will be described in detail more practically.

The saponification degree of the poly(vinyl alcohol) obtained by the method for producing the modified polymer compound according to the first aspect of the invention is preferably 60 to 100 mol %. When it is less than 60 mol %, it is sometimes difficult to obtain the intended characteristic needed as an intermediate film in the case where the poly (vinyl alcohol) is converted into a poly(vinyl acetal) resin.

The pure component of the poly(vinyl alcohol) obtained by the method for producing the modified polymer compound according to the first aspect of the invention is preferably 80 mol % or more. When it is less than 80 mol %, it is sometimes difficult to obtain the intended characteristic needed as an intermediate film in the case where the poly(vinyl alcohol) is converted into a poly(vinyl acetal) resin.

The transparency of the poly(vinyl alcohol) obtained by the method for producing the modified polymer compound according to the first aspect of the invention is preferably 80% or more. When it is less than 80%, it is sometimes difficult to obtain the intended characteristic needed as an intermediate film in the case where the poly(vinyl alcohol) is converted into a poly(vinyl acetal) resin.

If a metal ion remains in the poly(vinyl alcohol) obtained by the method for producing a modified polymer compound according to the first aspect of the invention, the thermal stability of the poly(vinyl alcohol) is sometime adversely affected. The remaining metal ion is more preferable as it is less and it is preferably 100 ppm or less, more preferably 50 ppm or less.

Next, the resultant poly(vinyl alcohol) is used as the polymer compound before reaction and an aldehyde is used as the reaction compound to produce the poly(vinyl acetal) resin by the method for producing the modified polymer compound of the invention.

The schematic structure of the poly(vinyl acetal) resin obtained by the production method of the invention will be shown as the following formula (1):

(wherein, R denotes alkyl of 1 to 10 carbon atoms or hydrogen, the alkyl may be a straight chain alkyl or a branched alkyl; and k, m and n denote independently a positive integer).

According to the production method of the invention, the poly(vinyl acetal) resin can be produced by dehydration condensation of poly(vinyl alcohol) and an aldehyde in a supercritical fluid or high temperature and high pressure fluid.

The average polymerization degree of the above-mentioned poly(vinyl alcohol) is preferably 100 to 4000. The saponification degree of the poly(vinyl alcohol) is preferably 60 mol % or more in order to obtain the poly(vinyl acetal) resin with excellent transparency and heat resistance.

Examples of the above-mentioned aldehyde may include an alkylaldehyde, formaldehyde and the like, and examples of the alkylaldehyde may include acetaldehyde, propionic aldehyde, n-butylaldehyde, isobutylaldehyde, varelic aldehyde, n-hexylaldehyde, 2-ethylbutyl aldehyde and the like.

These aldehydes may be used alone or two or more of them in combination. In particular, an alkylaldehyde and/or formaldehyde are preferable.

At the time of reaction, it is preferable to use the aldehyde in an excess amount relative to the poly(vinyl alcohol) and the excess degree is preferably 1 to 1000 times as much as the amount of the reaction compound and the supercritical fluid or high temperature and high pressure fluid as compared with the theoretically minimum amount to obtain an intended poly (vinyl acetal). When it is less than 1 time as much, the reaction cannot be promoted sufficiently in some cases, and when it is more than 1000 times, the concentration of the produced poly(vinyl acetal) resin becomes extremely thin; accordingly, the reaction efficiency is decreased to result in economical disadvantage.

The poly(vinyl acetal) resin produced by the method for producing the modified polymer compound according to the first aspect of the invention can be used preferably, for example, as a raw material for an intermediate film for laminated glass. In this case, the poly(vinyl acetal) resin is preferable to have acetalization degree of 60 to 80 mol % and a polymerization degree of 800 to 4000. When the polymerization degree is less than 800, the strength of the resin film becomes so weak as to deteriorate penetration resistance of the resultant laminated glass and, when it is more than 4000, the formability of the resin film is inferior or the strength of the resin film becomes so strong as to deteriorate the impact absorption capability of the resultant laminated glass.

Among the above-mentioned poly(vinyl acetal) resins, poly(vinyl butyral) resin is preferably used in terms of the proper adhesion force to glass and excellent transparency and weathering resistance.

A plasticizer and, if necessary, tin-doped indium oxide (hereinafter, abbreviated as "ITO") fine particles and the like are added to the poly(vinyl acetal) resin produced by the method for producing the modified polymer compound according to the first aspect of the invention to produce an intermediate film for laminated glass.

The intermediate film for laminated glass produced from such a poly(vinyl acetal) resin produced by the method for producing the modified polymer compound according to the first aspect of the invention is also included in the invention.

The above-mentioned plasticizer is not particularly limited as long as it is conventionally used for the intermediate film, and examples thereof may include triethylene glycol di-2-ethylhexanoate, triethylene glycol di-2-ethylbutylate, dihexyl adipate, tetraethylene glycol diheptanoate, tetraethylene di-2-ethylhexanoate, triethylene glycol diheptanoate and the like. They may be used alone or two or more of them may be used in combination. The addition amount of the above-mentioned plasticizer is not particularly limited and it is preferably 30 to 80 parts by weight to 100 parts by weight of the poly(vinyl acetal) resin.

The above-mentioned ITO fine particles can efficiently shield IR rays (heat rays); therefore, the resultant intermediate film for laminated glass and the resultant laminated glass are provided with excellent heat shielding capability.

The addition amount of the above-mentioned ITO fine particles is preferably 0.01 to 3 parts by weight to 100 parts by weight of the poly(vinyl acetal) resin. When the addition amount is less than 0.01 parts by weight, IR rays cannot be shielded sufficiently and the heat shielding capability of the resultant intermediate film and glass cannot be improved sufficiently in some cases. When it is more than 3 parts by weight, the visible light transmittance of the resultant intermediate film and glass is decreased or the haze is increased in some cases.

The average particle diameter of the above-mentioned ITO fine particles is preferably 80 nm or less, further preferably 10 to 80 nm. When it is more than 80 nm, scattering of the visible light rays by the particles becomes significant to result in deterioration of the transparency of the resultant intermediate film. As a result, the haze is deteriorated when the film is used for laminated glass and fails to satisfy the highly excellent transparency required for front glass of automobiles or the like. It is noted that the particle diameter of the above-mentioned ITO fine particles can be measured by a dynamic light scattering method using an argon laser as a light source and a light-scattering measurement apparatus (DLS-6000 AL, manufactured by Otsuka Electronics Co., Ltd.) in combination.

The above-mentioned ITO fine particles are preferably dispersed evenly and finely in the intermediate film for laminated glass of the invention. Even and fine dispersion of the fine particles gives low haze and excellent transparency when laminated glass is produced, and the heat shielding property is heightened in the entire intermediate film. Further, the adhesion force between the glass and the intermediate film is made adjustable, so that the penetration resistance can also be improved. It is further preferable to control the ITO fine particles with a particle diameter of 100 nm or more to be 1 or less per 1 $\mu m^2$ of the intermediate film for laminated glass.

The intermediate film for laminated glass is preferable to give 1.0% or less haze value of the laminated glass produced by using the film. It is because, when the haze value is more than 1.0%, the transparency of the laminated glass is low and that is not preferable for practical uses. However, an intermediate film for colored laminated glass is not limited as described.

The intermediate film for laminated glass of the invention is preferable to give 70% or more visible light transmissivity of the laminated glass produced by using the film. It is because, when the visible light transmissivity is less than 70%, the transparency of the laminated glass is low and that is not preferable for practical uses.

The intermediate film for laminated glass of the invention may contain, if necessary, a compound having one or more carboxyl groups, an adhesion force adjustment agent, an oxidation preventive agent for preventing deformation by heat in an extruder, a UV absorbent for improving weathering resistance and light-proofing property, and various types of stabilizers.

Laminated glass obtained by using the intermediate film for laminated glass of the invention is also included as one invention.

The glass to be used for the laminated glass of the invention is not particularly limited and commonly used transparent flat glass can be exemplified. For example, various types of inorganic glass such as float flat glass, polished flat glass, figured glass, wired plate glass, linear-wired plate glass and colored flat plate, and organic glass such as a polycarbonate plate and a poly(methyl methacrylate) plate can be used.

Examples of the uses of the laminated glass of the invention include for automotive front glass, automotive side glass, automotive rear glass, automotive roof glass as well as window glass for buildings.

The poly(vinyl acetal) resin produced by the method for producing the modified polymer compound according to the first aspect of the invention and a ceramic binder, an adhesive for printed circuit boards, a binder for ink, and a wash primer comprising the poly(vinyl butyral) resin are also included in the invention.

BEST MODE FOR CARRYING OUT THE INVENTION

The present invention will be described in more detail by way of examples, but the invention is not restricted only to these examples.

Reference Example 1

100 parts by weight of vinyl acetate was dissolved in 80 parts by weight of methanol and loaded into a separable flask. After the inside of the flask was purged with nitrogen, a solution obtained by dissolving 0.2 parts by weight of azobisisobutyronitrile (manufactured by Wako Pure Chemical Industries, Ltd.) as an oil-soluble azo type polymerization initiator in 20 parts by weight of methanol was dropwise titrated for 5 hours and, simultaneously, polymerization reaction was carried out at 60° C. After that, the polymerization reaction was continued at 60° C. for 3 hours and, then, the polymerization solution was cooled to a room temperature to obtain a poly(vinyl acetate) solution. The average polymerization degree of the resultant poly(vinyl acetate) solution was measured according to JIS K 6725-1977 to find it 1500.

Reference Example 2

100 parts by weight of vinyl acetate was dissolved in 80 parts by weight of ethanol and loaded into a separable flask. After the inside of the flask was purged with nitrogen, a solution obtained by dissolving 0.2 parts by weight of azobisisobutyronitrile (manufactured by Wako Pure Chemical Industries, Ltd.) as an oil-soluble azo type polymerization initiator in 20 parts by weight of ethanol was dropwise titrated for 3 hours and, simultaneously, polymerization reaction was carried out at 70° C. After that, the polymerization reaction was continued at 70° C. for 3 hours and, then, the polymerization solution was cooled to a room temperature to obtain a poly(vinyl acetate) solution. The average polymerization degree of the resultant poly(vinyl acetate) solution was measured similarly to Reference Example 1 to find it 900.

Reference Example 3

100 parts by weight of vinyl acetate was dissolved in 40 parts by weight of ethanol and 40 parts by weight of methanol, and loaded into a separable flask. After the inside of the flask was purged with nitrogen, a solution obtained by dissolving 0.2 parts by weight of azobisisobutyronitrile (manufactured by Wako Pure Chemical Industries, Ltd.) as an oil-soluble azo type polymerization initiator in 20 parts by weight of a mixed solution (methanol:ethanol=1:1) was dropwise titrated for 6 hours and, simultaneously, polymerization reaction was carried out at 70° C. After that, the polymerization reaction was continued at 70° C. for 3 hours and, then, the polymerization solution was cooled to a room temperature to obtain a poly(vinyl acetate) solution. The average polymerization degree of the resultant poly(vinyl acetate) solution was measured similarly to Reference Example 1 to find it 1050.

Reference Example 4

100 parts by weight of vinyl acetate and 80 parts by weight of water were loaded into a separable flask. After the inside of the flask was purged with nitrogen, the mixture was stirred to finely disperse the vinyl acetate monomer and, then, a solution obtained by dissolving 0.2 parts by weight of a water-soluble polymerization initiator (potassium persulfate, manu factured by Wako Pure Chemical Industries, Ltd.) in 20 parts by weight of water was dropwise titrated for 5 hours and, simultaneously, polymerization reaction was carried out at 85° C. After that, the polymerization reaction was continued at 85° C. for 3 hours and, then, the polymerization solution was cooled to a room temperature to obtain a poly(vinyl acetate) solution. The average polymerization degree of the obtained poly(vinyl acetate) solution was measured similarly to Reference Example 1 to find it 800.

insoluble in water existed or not. The results are shown in Table 1.

The use amounts of the additional fluids are shown as the mole ratios of the fluids loaded at the time of saponification reaction in Table 1.

The mole ratio of loaded fluid means practically the ratio of the number of moles of each additional fluid to the number of moles of vinyl acetate monomer calculated from poly(vinyl acetate) to be saponified.

TABLE 1

| | Poly(vinyl acetate) solution | Additional fluids | Reaction temperature (° C.) | Reaction pressure (MPa) | Reaction duration (min) | Loaded mole ratio | Poly(vinyl alcohol) Saponification (%) | Pure component (%) | Transparency (%) | Existence of resins insoluble in water |
|---|---|---|---|---|---|---|---|---|---|---|
| Example 1 | Reference Example 1 | Methanol | 350 | 40 | 4 | 40 | 99 | 99 | 99 | Existing |
| Example 2 | Reference Example 2 | Ethanol | 350 | 35 | 4 | 40 | 99 | 99 | 99 | Existing |
| Example 3 | Reference Example 3 | Methanol:Ethanol = 1:1 | 350 | 40 | 4 | 40 | 99 | 99 | 99 | Existing |
| Example 4 | Reference Example 4 | Water | 400 | 35 | 3 | 40 | 99 | 99 | 99 | Existing |
| Example 5 | Reference Example 1 | Methanol | 300 | 30 | 4 | 40 | 99 | 99 | 99 | None |
| Comparative Example 1 | Reference Example 1 | Methanol | 80 | 1 | 360 | 40 | 30 | 99 | 28 | — |
| Comparative Example 2 | Reference Example 2 | Ethanol | 70 | 1 | 480 | 40 | 35 | 99 | 32 | — |
| Comparative Example 3 | Reference Example 2 | Water | 90 | 0.5 | 360 | 40 | 40 | 99 | 40 | — |

Examples 1 to 5 and Comparative Examples 1 to 3

The poly(vinyl acetate) solutions obtained by Reference Examples 1 to 4 and additional fluids shown in Table 1 were loaded into a batch type hydrolysis reaction container 1 illustrated in FIG. 1 (a tubular container, made of SUS 316, Tube Bomb Reactor, the inner capacity: 10 mL). After the inside of the hydrolysis reaction container 1 was sufficiently purged with nitrogen, the hydrolysis reaction container 1 was rapidly heated to increase the reaction temperature and the reaction pressure as shown in Table 1 and was kept at the temperature for the reaction durations shown in Table 1. A molten metal salt bath 5 (manufactured by Shin-Nichiho Chemical Co., Ltd.) heated by a micro heater 2 (manufactured by Sukegawa Electric Co., Ltd.) was employed for heating the hydrolysis reaction container 1 and keeping the container 1 at the temperature. After a predetermined reaction duration, the hydrolysis reaction container 1 was cooled rapidly by a cooling bath and successively ice-cooled. After ice-cooling, the crystallized poly(vinyl alcohol) was recovered by filtration and dried. The saponification degree, the pure component and the transparency of the resultant poly(vinyl alcohol) were measured according to JIS K 6726-1994. Among aqueous solutions produced for the transparency evaluation, there were some solutions in which resins were completely dissolved and others in which resins were dissolved only partially. The difference of the resins in water was supposedly attributed to the difference of the degree of the intramolecular or intermolecular cross-linking by heating. Therefore, the transparency was evaluated so as to find whether resins Example 6 and Comparative Examples 4 and 5

The production apparatus shown in FIG. 2 was employed. A raw material mixture obtained by mixing 100 parts by weight of vinyl acetate with 0.2 parts by weight of azobisisobutyronitrile (manufactured by Wako Pure Chemical Industries, Ltd.) as an oil-soluble azo type polymerization initiator and 100 parts by weight of methanol was continuously loaded into a tubular polymerization reaction container 11 kept at 70° C. through a raw material loading inlet and, while polymerization reaction being carried out, the polymerization reaction solution was pressurized by a high pressure pump 13 at the outlet of the polymerization reaction container 11 and supplied to a hydrolysis reaction container 12. The retention time of the polymerization reaction solution in the polymerization reaction container 11 was for 3 hours. Further, high temperature and high pressure methanol was continuously supplied to the hydrolysis reaction container 12 by a high pressure pump 14 to adjust the reaction temperature and pressure as shown in Table 2 and carry out saponification reaction. The reaction pressure was adjusted by a pressure adjustment valve 20. After the reaction was carried out for the reaction duration shown in Table 2, the poly(vinyl alcohol) obtained from a separator 17 was dried. The saponification degree, the pure component, the transparency, and the existence of insoluble resin of the resultant poly(vinyl alcohol) were measured similarly to Example 1 and the results are shown in Table 2.

The use amounts of additional methanol introduced into the hydrolysis reaction container 12 by the high pressure pump 14 are shown as the loaded mole ratio of the fluid at the time of the saponification reaction in Table 2.

TABLE 2

| | Additional fluid | Reaction temperature (° C.) | Reaction pressure (MPa) | Reaction duration (min) | Loaded mole ratio | Poly(vinyl alcohol) | | Transparency (%) |
| --- | --- | --- | --- | --- | --- | --- | --- | --- |
| | | | | | | Saponification (%) | Pure component (%) | |
| Example 6 | Methanol | 350 | 40 | 2 | 40 | 99 | 99 | 99 |
| Comparative Example 4 | Methanol | 80 | 1 | 5 | 40 | 15 | 99 | 10 |
| Comparative Example 5 | Methanol | 90 | 0.5 | 5 | 40 | 21 | 99 | 16 |

Example 7

Preparation of Poly(Vinyl Butyral) Resin 0.5 g of poly(vinyl alcohol) particles with a polymerization degree of 1500 and a saponification degree of 99.5 mol % and 4 g of n-butyl aldehyde were loaded into a batch type reaction tube 1 (a tubular container, made of SUS 316, Tube Bomb Reactor, inner capacity: 10 mL) shown in FIG. 1. After the inside of the reaction tube 1 was sufficiently purged with nitrogen, the reaction tube 1 was rapidly heated to increase temperature and pressure respectively to the reaction temperature and pressure as shown in Table 4. During the reaction time as shown in Table 4, the temperature was kept as it was. A molten metal salt bath 5 (manufactured by Shin-Nippo Chemical Co., Ltd.) heated by a micro heater 2 (manufactured by Sukegawa Electric Co., Ltd.) was employed for heating the reaction tube 1 and keeping the tube 1 at the temperature. After a predetermined reaction duration, the reaction tube 1 was cooled rapidly by a cooling bath and successively ice-cooled. After ice-cooling, the poly(vinyl butyral) resin was recovered, washed and dried.

The use amount of the above-mentioned n-butyl aldehyde is shown as the loaded mole ratio of the fluid at the time of the modification reaction (condensation reaction) in Table 4.

The acetalization degree and the pure component of the resultant poly(vinyl butyral) resin were measured and shown in Table 4. The acetalization degree was measured by a method of measuring the H nuclear magnetic resonance spectrum, and the pure component was measured according to JIS K 6728. It is noted that Japanese Kokai Publication Hei-5-1109 describes the acetalization degree measurement method in detail.

The intramolecular or intermolecular cross-linking degree by heating the resultant poly(vinyl butyral) resin can supposedly be evaluated as the difference of the solubility in methanol. Therefore, a methanol solution containing 1% of the resultant poly(vinyl butyral) resin was prepared and whether insoluble resin was in the methanol solution or not was observed. The results are shown in Table 4.

(Production of Plasticizer Containing ITO Dispersed Therein)

1 part by weight of ITO fine particles were added to 40 parts by weight of a plasticizer (triethylene glycol di-2-ethylhexanoate) and, as a dispersant, a polyphosphoric acid ester salt was used to disperse the ITO fine particles in the plasticizer by a horizontal micro-bead mill. After that, 0.1 parts by weight of acetyl acetone was added while being stirred to the resulting dispersion to obtain the plasticizer containing ITO dispersed therein. The average particle diameter of the ITO fine particles in the dispersion was 35 nm.

(Production of Intermediate Film for Laminated Glass)

40 parts by weight of the plasticizer containing ITO dispersed therein and magnesium 2-ethylbutyrate in a proper amount so as to adjust the Mg content to be 60 ppm in the total amount were added to 100 parts by weight of the resultant poly(vinyl butyral) resin, and the mixture was sufficiently melted and kneaded by a mixing roll and, then, press-formed at 150° C. for 30 minutes by a press forming apparatus to obtain an intermediate film with an average film thickness of 0.76 mm. The average particle diameter of the ITO fine particles in the intermediate film was 56 nm and no particle with a particle diameter of 100 nm or more was observed.

(Production of Laminated Glass)

The intermediate film for laminated glass obtained in the above-mentioned manner was sandwiched between transparent float glass plates (30 cm in length×30 cm in width×2.5 mm in thickness) and the resultant laminated glass body was subjected to degassing in a rubber bag in 2.6 kPa of vacuum degree for 20 minutes and, as being degassed, the laminated glass body was transferred to an oven and, further, vacuum-pressed at 90° C. for 30 minutes. The resulting pre-bonded laminated glass body was press-bonded in an autoclave under conditions of 135° C. and 1.2 MPa pressure for 20 minutes to obtain laminated glass.

(Physical Property Tests of Laminated Glass)

The resultant laminate glass was subjected to the haze value measurement, the visible light transmissivity measurement, Pummel value measurement, and moisture resistance test according to the following evaluation methods.

1) Haze Value

The haze value measurement was carried out according to "Methacrylic resin plate for aircrafts" JIS K 6714 by using an integrating turbidity meter (manufactured by Tokyo Denshoku Co., Ltd.) and the haze value of the laminated glass to light rays with wavelength of 340 to 1800 nm was measured.

2) Visible Light Transmissivity

The visible light transmissivity was measured according to "Testing method on transmittance, reflectance and emittance of flat glasses and evaluation of solar heat gain coefficient" JIS R 3106 (1998) and "Testing method of object color" JIS Z 8722 (1982) by using a directly recording type spectrophotometer (trade name: UV 3100, manufactured by Shimadzu Corporation) The visible light transmissivity was measured in a wavelength range of 380 to 780 nm.

3) Pummel Value

The adhesion property of the intermediate film to glass was evaluated on the basis of Pummel value. The detail of the testing method is as follows. That is, laminated glass was left at −18±0.6° C. for 16 hours and crushed by a hammer with a head part of 0.45 kg until the particle size of the glass became 6 mm or less. The glass was partially peeled off and the ratio of the intermediate film exposed to the surface was regarded as the exposure degree. The exposure degree of the intermediate film was evaluated according to the previously graded sample standard and the results were shown as Pummel values in Table 3. As the Pummel value is higher, the adhesion strength to glass is higher and as the Pummel value is lower, the adhesion strength to glass is lower.

TABLE 3

| Exposure degree of intermediate film (%) | Pummel value |
| --- | --- |
| 100 | 0 |
| 90 | 1 |
| 85 | 2 |
| 60 | 3 |
| 40 | 4 |
| 20 | 5 |
| 10 | 6 |
| 5 | 7 |
| 2 or less | 8 |

4) Moisture Resistance Test

The moisture resistance test was carried out according to "Test method of safety glazing materials for road vehicles" JIS R 3212 (1992) by using a temperature and humidity controlled bath.

The results of these tests are shown in Table 5 and all of these values were in standardized values required for the laminated glass.

Example 8

Preparation of Polyvinyl Acetoacetal Resin

Poly(vinyl acetal) resin was obtained in the same manner as Example 1, except that 2.5 g of acetaldehyde was used in place of 4 g of n-butyl aldehyde in Example 7 and the reaction pressure was changed to be 9 MPa. With respect to the resultant poly(vinyl acetal) resin, the acetalization degree, the purity, and existence of the methanol-insoluble matter were measured in the same manner as Example 6 and the results are shown in Table 4.

Using the resultant polyvinyl acetoacetal resin, laminated glass was produced in the same manner as Example 6 and subjected to the physical property testes. The test results are shown in Table 5 and all of the values were found in the standardized values required for the laminated glass.

Example 9

Preparation of Poly(Vinyl Butyral) Resin

Poly(vinyl acetal) resin was obtained in the same manner as Example 6, except that in place of 0.5 g of poly(vinyl alcohol) particles with a polymerization degree of 1500 and a saponification degree of 99.5 mol % and 4 g of n-butyl aldehyde in Example 7, 0.5 g of poly(vinyl alcohol) with the same polymerization degree and saponification degree, 3.2 g of n-butylaldehyde, and 0.8 g of water (as an additional fluid) were loaded into the reaction tube 1 and the reaction temperature and pressure was adjusted to be 400° C. and 25 MPa, respectively.

The use amount of the above-mentioned n-butyl aldehyde was shown as the loaded mole ratio in the fluid at the time of the modification reaction (condensation reaction) and shown in Table 4.

With respect to the resultant poly(vinyl butyral) resin, the acetalization degree, the purity, and existence of the methanol-insoluble matter were measured in the same manner as Example 7 and the results are shown in Table 4.

Using the resultant poly(vinyl butyral) resin, laminated glass was produced in the same manner as Example 7 and subjected to the physical property testes. The test results are shown in Table 5 and all of the values were found in the standardized values required for the laminated glass.

Example 10

Preparation of Poly(Vinyl Butyral) Resin 1 g of poly(vinyl alcohol) particles with a polymerization degree of 1200 and a saponification degree of 99.5 mol %, 2.5 g of n-butyl aldehyde and 2.5 g of water (as an additional fluid) were loaded into a batch type reaction tube 1 (a tubular container, made of SUS 316, Tube Bomb Reactor, inner capacity: 10 mL) shown in FIG. 1. After the inside of the reaction tube 1 was sufficiently purged with argon, the reaction tube 1 was rapidly heated to increase temperature and pressure, respectively, to the reaction temperature and pressure as shown in Table 4. During the reaction time shown in Table 4, the temperature was kept as it was. A molten metal salt bath 5 (manufactured by Shin-Nippo Chemical Co., Ltd.) heated by a micro heater 2 (manufactured by Sukegawa Electric Co., Ltd.) was employed for heating the reaction tube 1 and keeping the tube 1 at the temperature. After a predetermined reaction duration, the reaction tube 1 was cooled rapidly by a cooling bath and, successively, ice-cooled. After ice-cooling, the recovered solution was washed with water, and the poly(vinyl butyral) resin was recovered and dried.

The use amount of the n-butyl aldehyde is shown as the loaded mole ratio of the fluid at the time of the modification reaction (condensation reaction) in Table 4.

With respect to the resultant poly(vinyl butyral) resin, the acetalization degree, the purity, and existence of the methanol-insoluble matter were measured in the same manner as Example 7 and the results are shown in Table 4.

Using the resultant poly(vinyl butyral) resin, laminated glass was produced in the same manner as Example 7 and subjected to the physical property testes. The test results are shown in Table 5 and all of the values were found in the standardized values required for the laminated glass.

The polymerization degree of the resultant poly(vinyl butyral) resin was measured to find it 1000.

Example 11

Preparation of Polyvinyl Acetoacetal Resin

Polyvinyl acetoacetal resin was obtained in the same manner as Example 9, except that 2.5 g of acetoaldehyde was used in place of 2.5 g of n-butyl aldehyde in Example 10 and the reaction pressure was changed to be 12 MPa.

The use amount of the acetoaldehyde is shown as the loaded mole ratio of the fluid at the time of the modification reaction (condensation reaction) in Table 4.

With respect to the resultant polyvinyl acetoacetal resin, the acetalization degree, the pure component, and existence of the methanol-insoluble matter were measured in the same manner as Example 7 and the results are shown in Table 4.

Using the resultant polyvinyl acetoacetal resin, laminated glass was produced in the same manner as Example 7 and subjected to the physical property testes. The test results are shown in Table 5 and all of the values were found in the standardized values required for the laminated glass.

Example 12

Preparation of Poly(Vinyl Butyral) Resin 0.5 g of poly(vinyl alcohol) particles with a polymerization degree of 1500 and a saponification degree of 99.5 mol %, 2.5 g of n-butyl aldehyde and 2.5 g of water (as an additional fluid) were loaded into a batch type reaction tube 1 (a tubular container, made of SUS 316, Tube Bomb Reactor, inner capacity: 10 mL) shown in FIG. 1. After the inside of the reaction tube 1 was sufficiently purged with carbon dioxide, the reaction tube 1 was rapidly heated to increase temperature and pressure, respectively, to the reaction temperature and pressure as shown in Table 4. During the reaction time shown in Table 4, the temperature was kept as it was. A molten metal salt bath 5 (manufactured by Shin-Nippo Chemical Co., Ltd.) heated by a micro heater 2 (manufactured by Sukegawa Electric Co., Ltd.) was employed for heating the reaction tube 1 and keeping the tube 1 at the temperature. After a predetermined reaction duration, the reaction tube 1 was cooled rapidly by a cooling bath and, successively, ice-cooled. After ice-cooling, the poly(vinyl butyral) resin was recovered and dried.

The use amount of the n-butyl aldehyde is shown as the loaded mole ratio of the fluid at the time of the modification reaction (condensation reaction) in Table 4.

With respect to the resultant poly(vinyl butyral) resin, the acetalization degree, the purity, and existence of the methanol-insoluble matter were measured in the same manner as Example 7 and the results are shown in Table 4.

Using the resultant poly(vinyl butyral) resin, laminated glass was produced in the same manner as Example 7 and subjected to the physical property testes. The test results are shown in Table 5 and all of the values were found in the standardized values required for the laminated glass.

Example 13

Preparation of Poly(Vinyl Butyral) Resin

The production apparatus shown in FIG. 2 was employed. Poly(vinyl alcohol) and water supplied at a speed of 100 parts by weight/h and 300 parts by weight/h, respectively, to a polymer compound dissolution tank 11 and, while the polymer compound being dissolved in water, the resultant mixture was sent to a modification reaction (condensation reaction) container 12 at 400 parts by weight/h by a high pressure pump 13. On the other hand, n-butyl aldehyde was sent at a speed of 300 parts by weight/h by a high pressure pump 14a and, as an additional fluid, water was sent at a speed of 700 parts by weight/h by a high pressure pump 14b and they were continuously introduced into the modification reaction (condensation reaction) container 12 to carry out reaction in the modification reaction (condensation reaction) container adjusted to be at a reaction temperature 300° C. and a reaction pressure of 15 MPa. The reaction pressure in the reaction system was adjusted by a pressure adjustment valve 20. The reaction was carried out for 0.5 minute and, after the reaction, the poly(vinyl butyral) resin obtained from a separator 17 was dried. The use amount of n-butyl aldehyde was adjusted so as to be 1.6 on the basis the loaded mole ratio of the fluid at the time of the modification reaction (condensation reaction).

The butyralization degree and the pure component of the resultant poly(vinyl butyral) resin were measured in the same manner as Example 7 to find that the butyralization degree was 70% and the pure component was 99%.

Using the resultant poly(vinyl butyral) resin, laminated glass was produced in the same manner as Example 7 and subjected to the physical property testes. The test results are shown in Table 5 and all of the values were found in the standardized values required for the laminated glass.

TABLE 4

| | Poly (vinyl alcohol) | | | Fluid | | | |
| | | | | Aldehyde | | Additional fluid | |
| | Polymerization degree | Saponification degree (%) | Use amount (g) | Type | Use amount (g) | Type | Use amount (g) |
|---|---|---|---|---|---|---|---|
| Example 7 | 1500 | 99.5 | 0.5 | Butyl aldehyde | 4 | — | — |
| Example 8 | 1500 | 99.5 | 0.5 | Acetaldehyde | 2.5 | — | — |
| Example 9 | 1500 | 99.5 | 0.5 | Butyl aldehyde | 3.2 | Water | 0.8 |
| Example 10 | 1200 | 99.5 | 1 | Butyl aldehyde | 2.5 | Water | 2.5 |
| Example 11 | 1200 | 99.5 | 1 | Acetaldehyde | 2.5 | Water | 2.5 |
| Example 12 | 1500 | 99.5 | 0.5 | Butyl aldehyde | 2.5 | Water-carbon dioxide atmosphere | 2.5 |

TABLE 4-continued

|  | Reaction temperature (° C.) | Reaction pressure (MPa) | Reaction duration (min) | Loaded mole ratio | Polyvinyl acetal resin Acetalization degree (%) | Pure component (%) | Existence of resins insoluble in methanol |
|---|---|---|---|---|---|---|---|
| Example 7 | 300 | 10 | 10 | 5 | 70 | 99 | None |
| Example 8 | 300 | 9 | 10 | 5 | 64 | 99 | None |
| Example 9 | 400 | 25 | 10 | 4 | 68 | 99 | Existing |
| Example 10 | 300 | 10 | 5 | 1.6 | 71 | 99 | None |
| Example 11 | 300 | 12 | 5 | 3.4 | 73 | 99 | None |
| Example 12 | 300 | 12 | 5 | 1.6 | 70 | 99 | None |

TABLE 5

|  | Haze value (%) | Visible light transmittance (%) | Pummel value | Peeling after moisture resistance test |
|---|---|---|---|---|
| Example 7 | 0.7 | 83 | 4 | None |
| Example 8 | 0.6 | 81 | 4 | None |
| Example 9 | 0.7 | 77 | 4 | None |
| Example 10 | 0.7 | 83 | 4 | None |
| Example 11 | 0.7 | 81 | 4 | None |
| Example 12 | 0.7 | 83 | 4 | None |
| Example 13 | 0.7 | 83 | 4 | None |

INDUSTRIAL APPLICABILITY

The invention can provide a method for producing a modified polymer compound and a production apparatus of a modified polymer capable of producing a modified polymer compound with a high purity in a short time, and such a modified polymer compound.

The invention claimed is:

1. A method for producing a poly(vinyl acetal) resin, comprising chemically modifying a poly(vinyl alcohol) in a supercritical fluid or a high temperature and high pressure fluid of 100 to 700° C. and 0.5 to 100 MPa, wherein the supercritical fluid or the high temperature and high pressure fluid consists essentially of a substance in a liquid state at a normal temperature and normal pressure which comprises an aldehyde and water.

2. The method for producing a poly(vinyl acetal) resin according to claim 1, wherein the supercritical fluid or the high temperature and high pressure fluid consists essentially of a two-component-mixed fluid of an aldehyde and water.

* * * * *